United States Patent
Chen et al.

(10) Patent No.: US 7,639,691 B2
(45) Date of Patent: Dec. 29, 2009

(54) METHOD FOR MANAGING CUSTOMER PREMISES EQUIPMENT AND COMMUNICATION SYSTEM EMPLOYING THE METHOD

(75) Inventors: Shih-Pin Chen, Taipei Hsien (TW); Ching-I Lu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 427 days.

(21) Appl. No.: 11/556,188

(22) Filed: Nov. 3, 2006

(65) Prior Publication Data
US 2007/0206588 A1 Sep. 6, 2007

(30) Foreign Application Priority Data
Mar. 3, 2006 (CN) .................. 2006 1 0034175

(51) Int. Cl.
*H04L 12/28* (2006.01)
(52) U.S. Cl. .................. 370/392; 370/400; 709/225
(58) Field of Classification Search .................. None
See application file for complete search history.

(56) References Cited

U.S. PATENT DOCUMENTS

| | | | |
|---|---|---|---|
| 7,325,060 B2 * | 1/2008 | Claseman | 709/225 |
| 2004/0109469 A1 * | 6/2004 | Lazarski et al. | 370/463 |
| 2005/0078699 A1 * | 4/2005 | Cummings | 370/437 |
| 2005/0213560 A1 | 9/2005 | Duvvury | |

\* cited by examiner

*Primary Examiner*—Jayanti K Patel
*Assistant Examiner*—Jung Park
(74) *Attorney, Agent, or Firm*—Wei Te Chung (57) ABSTRACT

A method for managing customer premises equipment (CPE) includes the following steps. A management device generates a management request frame according to a name of a CPE and a command for the CPE to execute. The management device broadcasts the management request frame to the CPE. The CPE determines whether the management request frame is correct after the CPE receives the management request frame. The CPE executes the command in the management request frame if the management request frame is correct. The CPE reports a result to the management device. A communication system employing the method is also provided.

20 Claims, 5 Drawing Sheets

METHOD FOR MANAGING CUSTOMER PREMISES EQUIPMENT AND COMMUNICATION SYSTEM EMPLOYING THE METHOD

BACKGROUND OF THE INVENTION

1. Field of the Invention

The invention relates to communications, and particularly to a communication system and a method for managing customer premises equipment (CPE) employed in the communication system.

2. Description of Related Art

Conventionally, customer premises equipment (CPE) are mostly managed by Internet protocol (IP) addresses thereof. The IP addresses are 32-bit numbers that uniquely identify the CPE in an IP network.

However, in some cases, a CPE may be not configured with an IP address. For example, when a connection of an asymmetric digital subscriber line (ADSL) modem is abnormal, the ADSL modem may not be configured with an IP address. In such case, the CPE cannot be managed by IP addresses, i.e., management of the CPE will be impossible unless the IP addresses are available again.

SUMMARY OF THE INVENTION

An exemplary embodiment of the present invention provides a communication system. The communication system includes a management subsystem and an executing subsystem. The management subsystem for managing the executing subsystem includes a specifying module, a transmitting module, and a listening module. The specifying module receives a name and a command. The transmitting module generates a management request frame according to the name and the command, and broadcasts the management request frame to the executing subsystem. The executing subsystem executes the command, and reports a result to the management subsystem. The listening module receives the result from the executing subsystem.

Another exemplary embodiment of the present invention provides a method for managing customer premises equipment (CPE) including the following steps. A management device generates a management request frame according to a name of a CPE and a command for the CPE to execute. The management device broadcasts the management request frame to the CPE. The CPE determines whether the management request frame is correct after the CPE receives the management request frame. The CPE executes the command in the management request frame if the management request frame is correct. The CPE reports a result to the management device.

Other advantages and novel features will become more apparent from the following detailed description when taken in conjunction with the accompanying drawings, in which:

DETAILED DESCRIPTION OF THE INVENTION

Figure 1:
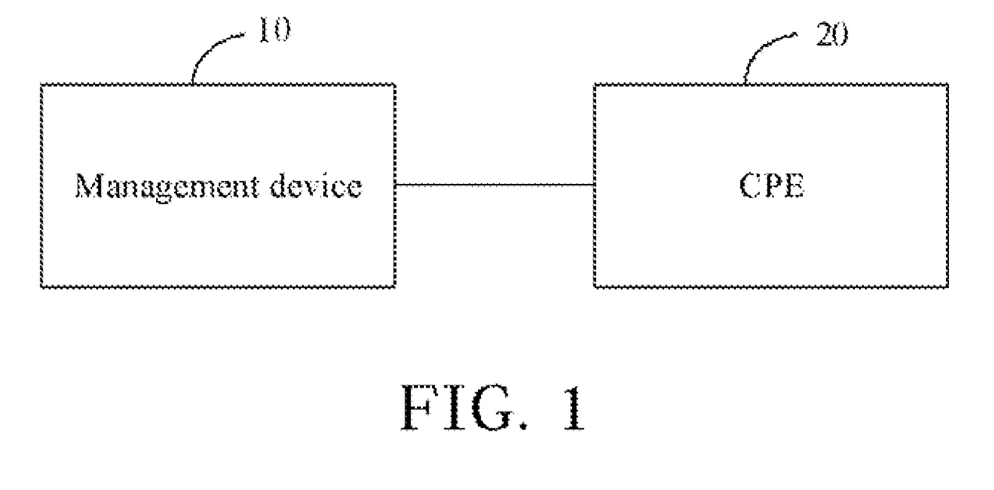
FIG. 1 is a schematic diagram of an application environment of a communication system of an exemplary embodiment of the present invention.

FIG. 1 is a schematic diagram of an application environment of a communication system of an exemplary embodiment of the present invention. In the exemplary embodiment, the communication system includes a management device 10 and a customer premises equipment (CPE) 20 data-communicable with the management device 10 through a network. In this embodiment, the management device 10 may be a computer, a personal digital assistant (PDA), a mobile phone, or another electronic device. The management device 10 is connected to the CPE 20 by wired connection for the network. In other embodiments, the management device 10 may be wirelessly connected to the CPE 20, i.e., the network is a wireless network.

When the CPE 20 is not configured with an Internet protocol (IP) address, the management device 10 can manage the CPE 20. In the exemplary embodiment, the management device 10 broadcasts a management request frame to find the CPE 20 and to manage the CPE 20.

Figure 2:
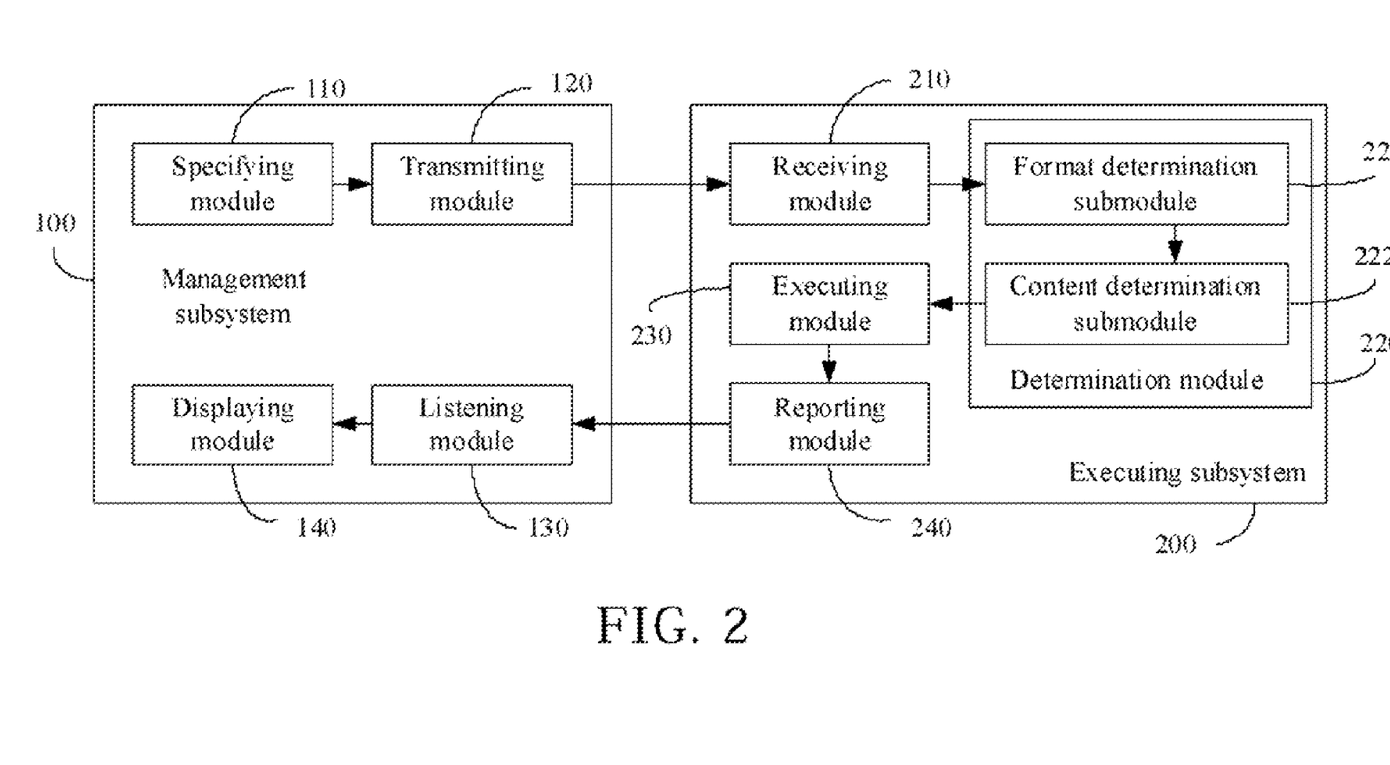
FIG. 2 is a schematic diagram of functional modules of a communication system of another exemplary embodiment of the present invention.

FIG. 2 is a schematic diagram of functional modules of a communication system of an exemplary embodiment of the present invention. In the exemplary embodiment, the communication system includes a management subsystem 100 and an executing subsystem 200. The management subsystem 100 may be included in the management device 10 (shown in FIG. 1). The executing subsystem 200 may be included in the CPE 20 (shown in FIG. 1). The management device 10 manages the CPE 20 via the management subsystem 100 and the executing subsystem 200, when the CPE 20 is not configured with an IP address.

The management subsystem 100 includes a specifying module 110, a transmitting module 120, a listening module 130, and a displaying module 140. The specifying module 110 receives a name of the CPE 20 and a command for the CPE 20 to execute. In the exemplary embodiment, the name of the CPE 20 may be a model name or model number of the CPE 20, or the like. By using the specifying module 110, a user can initially specify the model name of the CPE 20 that the user wants to manage, and then input the command for the CPE 20 to execute, for example, a command for the CPE 20 to report a media access control (MAC) address thereof.

The transmitting module 120 generates a management request frame according to the name of the CPE 20 and the command for the CPE 20 to execute, and broadcasts the management request frame 1000 to the CPE 20.

Figure 3:
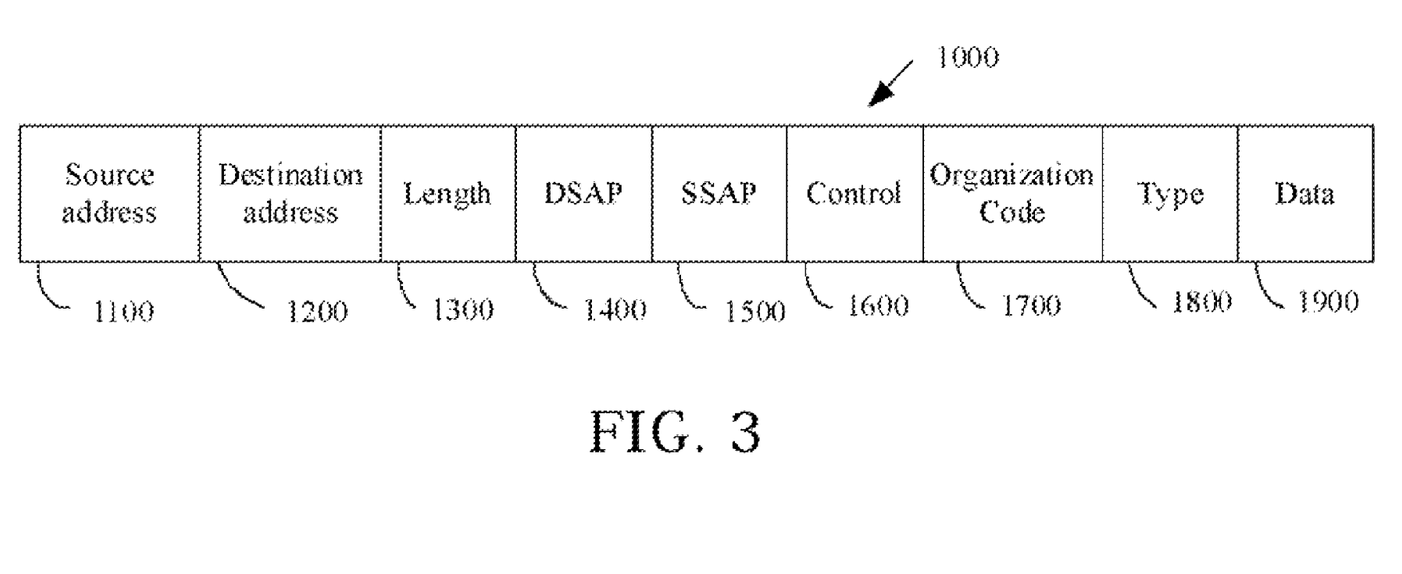
FIG. 3 is a schematic diagram of a management request frame of a further exemplary embodiment of the present invention.

FIG. 3 is a schematic diagram of the management request frame 1000 of an exemplary embodiment of the present invention. The management request frame 1000 includes a source address field 1100, a destination address field 1200, a length field 1300, a destination service access point (DSAP) field 1400, a source service access point (SSAP) field 1500, a control field 1600, an organization code field 1700, a type field 1800, and a data field 1900.

The source address field 1100, the destination address field 1200, and the length field 1300 are defined by the institute of electrical and electronics engineers (IEEE) 802.3 MAC layer. The source address field 1100 indicates an MAC address of a station transmitting the management request frame 1000. In the exemplary embodiment, the source address field 1100 is set to an MAC address of the management device 10. The destination address field 1200 indicates an MAC address of a station receiving the management request frame 1000. In the exemplary embodiment, the management request frame 1000 is a broadcast frame, so the destination address field 1200 is a broadcast address, for example, FF:FF:FF:FF:FF:FF. The length field 1300 indicates a length from the DSAP field 1400 to the data field 1900.

The DSAP field 1400, the SSAP field 1500, and the control field 1600 are defined by the IEEE 802.2 logical link control (LLC) layer. The DSAP field 1400 and the SSAP field 1500 indicate an upper layer protocol type of the management request frame 1000. In the exemplary embodiment, the DSAP field 1400 and the SSAP field 1500 are both set to 0xaa, indicating the upper layer protocol type is a sub-network access protocol (SNAP). The control field 1600 is for specific protocols management. In the exemplary embodiment, the control field 1600 is set to a default value of the 802.2 LLC protocol, namely 0x03.

The organization code field 1700 and the type field 1800 are defined by the 802.2 SNAP. In the exemplary embodiment, content of the organization code field 1700 is predefined by the management device 10 and the CPE 20, for authentication between the management device 10 and the CPE 20 during communication. The organization code field 1700 is set according to the name of the CPE 20 by the management device 10. The type field 1800 indicates a type of the data field 1900. The data field 1900 includes the command for the CPE 20 to execute.

Referring to FIG. 1 and FIG. 2 again, the executing subsystem 200 receives the management request frame 1000, executes the command, and then reports a result to the listening module 130 of the management subsystem 100 of the management device 10. In the exemplary embodiment, the executing subsystem 200 includes a receiving module 210, a determination module 220, an executing module 230, and a reporting module 240. The receiving module 200 receives the management request frame 1000. The determination module 220 determines whether the management request frame 1000 is correct. In the exemplary embodiment, when a format of the management request frame 1000 is valid, and content of the management request frame 1000 is correct, the management request frame 1000 is correct. Otherwise, the management request frame 1000 is not correct. The determination module 220 includes a format determination submodule 221 and a content determination submodule 222.

The format determination submodule 221 determines whether the format of the management request frame 1000 is valid. In the exemplary embodiment, the format determination submodule 221 determines whether the format of the management request frame 1000 is valid according to the DSAP field 1400, the SSAP field 1500, the control field 1600, and the organization code field 1700. If the DSAP field 1400, the SSAP field 1500, the control field 1600, and the organization code field 1700 are all valid, for example, the DSAP field 1500 and the SSAP field 1500 are both set to 0xaa, the control field 1600 is set to 0x0a, and the content in the organization code field 1700 is predefined by the management device 10 and the CPE 20, then the format of the management request frame 1000 is valid. Otherwise, the format of the management request frame 1000 is invalid.

If the format of the management request frame 1000 is valid, the content determination submodule 222 determines whether the content of the management request frame 1000 is correct. If the format of the management request frame 1000 is invalid, the format determination submodule 221 discards the management request frame 1000.

In the exemplary embodiment, the content determination submodule 222 determines whether the content of the management request frame 1000 is correct according to the data field 1900 of the management request frame 1000. If the content determination submodule 222 can identify content of the data field 1900, for example, a length of the data field 1900 and the command included in the data field 1900, the content of the management request frame 1000 is correct. If the content determination submodule 222 cannot identify the content of the data field 1900, the content of the management request frame 222 is incorrect.

If the content of the management request frame 1000 is incorrect, the content determination submodule 222 discards the management request frame 1000. If the content of the management request frame 1000 is correct, the executing module 230 executes the command included in the management request frame 1000, for example, the command for reporting the MAC address of the CPE 20. The reporting module 240 reports the result to the management device 10, for example, reporting the MAC address of the CPE 20 to the management device 10. Accordingly, the listening module 130 of the management subsystem 100 receives the result from the reporting module 240. The displaying module 140 of the management subsystem 200 displays the result, for example, displaying the MAC address of the CPE 20.

Figure 4:
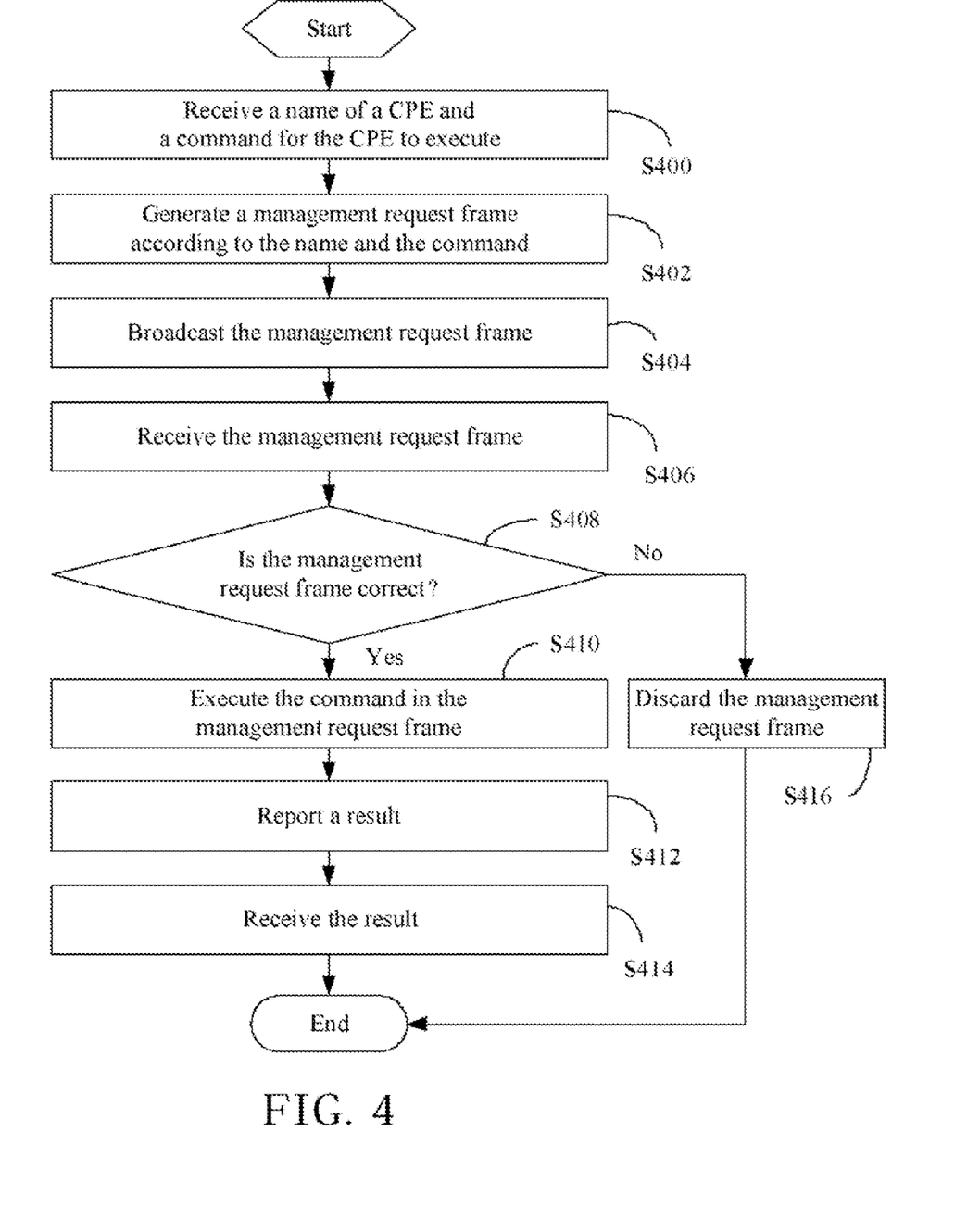
FIG. 4 is a flowchart of a method for managing customer premises equipment (CPE) of a still further exemplary embodiment of the present invention.

FIG. 4 is a flowchart of a method for managing CPE of an exemplary embodiment of the present invention. In the exemplary embodiment, the management device 10 manages the CPE 20 by the management request frame 1000.

In step S400, the management device 10 receives a name of the CPE 20 and a command for the CPE 20 to execute. In step S402, the management device 10 generates the management request frame 1000 according to the name and the command. In step S404, the management device 10 broadcasts the management request frame 1000 to the CPE 20.

In step S406, the CPE 20 receives the management request frame 1000. In step S408, the CPE 20 determines whether the management request frame is correct. If the management request frame 1000 is correct, in step S410, the CPE 20 executes the command in the management request frame 1000. If the management request frame 1000 is incorrect, in step S416, the CPE 20 discards the management request frame 1000.

In step S412, the CPE 20 reports a result to the management device 10. In step S414, the management device 10 receives the result from the CPE 20. Therefore, the management device 10 finishes managing the CPE 20.

Figure 5:
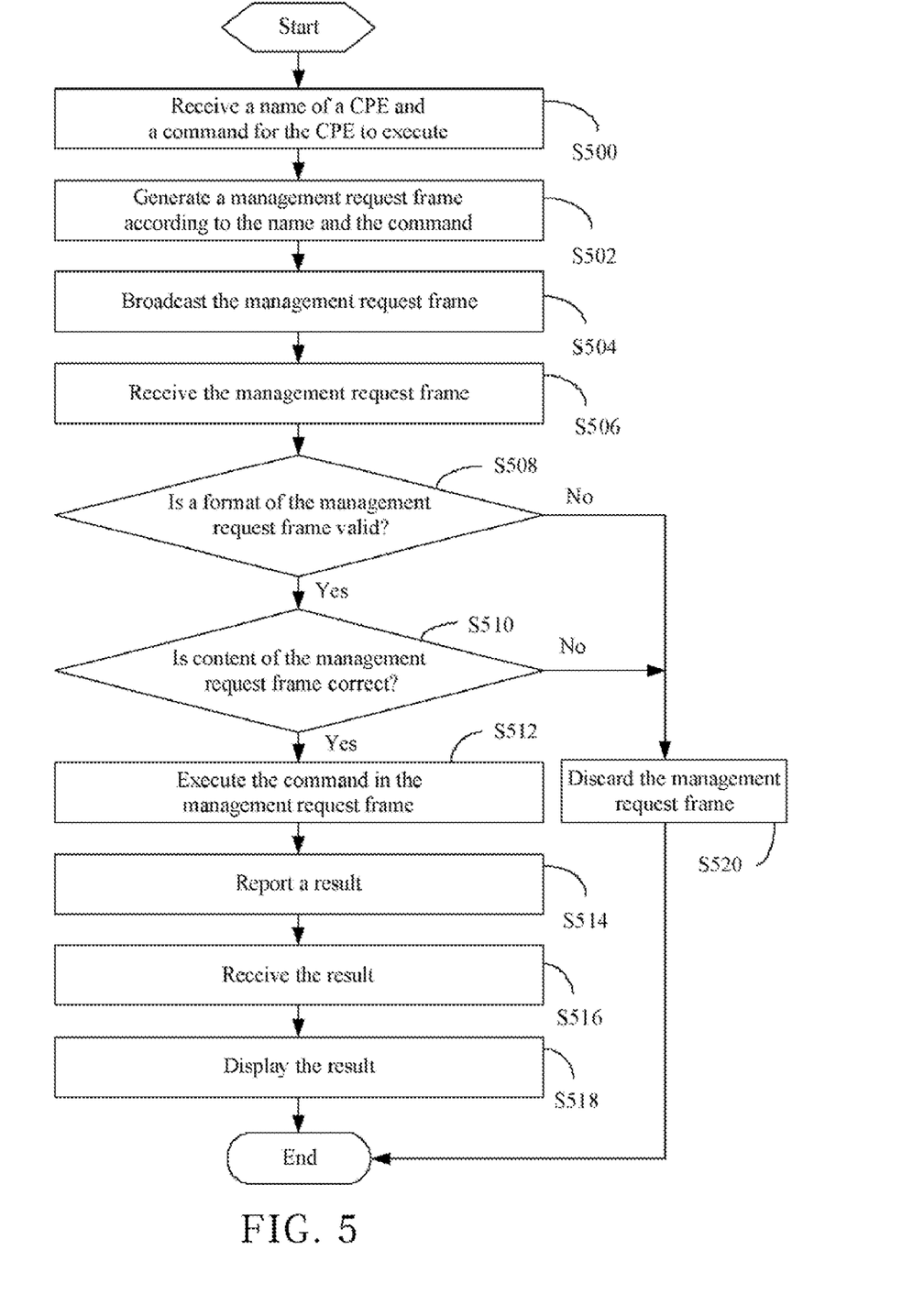
FIG. 5 is a detailed flowchart of the method for managing CPE of FIG. 4.

FIG. 5 is a detailed flowchart of the method for managing CPE of FIG. 4.

In step S500, the specifying module 110 of the management device 10 receives a name of the CPE 20 and a command for the CPE 20 to execute.

In step S502, the transmitting module 120 generates the management request frame 1000 according to the name of the CPE 20 and the command.

In step S504, the transmitting module 120 broadcasts the management request frame 1000.

Referring also to FIG. 3, the source address field 1100 is a MAC address of the management device 10. The destination address field 1200 is a broadcast address, for example, FF:FF:FF:FF:FF:FF. The length field 1300 is a length from the DSAP field 1400 to the data field 1900. The DSAP field 1400 and the SSAP field 1500 are both set to 0xaa, indicating an upper layer protocol type is a SNAP. The control field 1600 is a default value of the 802.2 LLC protocol, namely 0x03. The content in the organization code field 1700 is predefined by the management device 10 and the CPE 20, for authentication between the management device 10 and the CPE 20 during communication. The type field 1800 indicates a type of the data field 1900. The data field 1900 includes the command for the CPE 20 to execute.

In step S506, the receiving module 200 of the CPE 20 receives the management request frame 1000.

In step S508, the format determination submodule 221 determines whether the format of the management request frame 1000 is valid. In the exemplary embodiment, the format determination submodule 221 determines whether the format of the management request frame 1000 is valid according to the DSAP field 1400, the SSAP field 1500, the control field 1600, and the organization code field 1700. If the DSAP field 1400, the SSAP field 1500, the control field 1600, and the organization code field 1700 are all valid, the format of the management request frame 1000 is valid. Otherwise, the format of the management request frame 1000 is invalid.

If the format of the management request frame 1000 is invalid, in step S520, the format determination submodule 221 discards the management request frame 1000.

If the format of the management request frame 1000 is valid, in step S510, the content determination submodule 222 determines whether content of the management request frame 1000 is correct. In the exemplary embodiment, the content determination submodule 222 determines whether the content of the management request frame 1000 is correct according to the data field 1900 of the management request frame 1000. If the content determination submodule 222 can identify content of the data field 1900, the content of the management request frame 1000 is correct. If the content determination submodule 222 cannot identify the content of the data field 1900, the content of the management request frame 222 is incorrect.

If the content of the management request frame 1000 is incorrect, in step S520, the content determination submodule 222 discards the management request frame 1000.

If the content of the management request frame 1000 is correct, in step S512, the executing module 230 executes the command in the management request frame 1000.

In step S514, the reporting module 240 reports a result to the management device 10.

In step S516, the listening module 130 of the management device 10 receives the result from the reporting module 240.

In step S518, the displaying module 140 displays the result.

When the CPE 20 is not configured with an IP address, the management device 10 of the exemplary embodiment broadcasts a management request frame to find the CPE 20, and then manages the CPE 20.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A communication system, comprising:
an executing subsystem; and
a management subsystem, for managing the executing subsystem, comprising:
a specifying module, for receiving a name and a command;
a transmitting module, for generating a management request frame according to the name and the command, and broadcasting the management request frame to the executing subsystem, wherein the management request frame comprises an organization code field, wherein content of the organization code field is predefined by the management subsystem and the executing subsystem, for authentication between the management subsystem and the executing subsystem during communication between the management subsystem and the executing subsystem; and
a listening module, for receiving a result from the executing subsystem;
wherein the executing subsystem executes the command, and reports the result to the management subsystem.

2. The communication system as claimed in claim 1, wherein the management subsystem further comprises a displaying module for displaying the result.

3. The communication system as claimed in claim 1, wherein the executing subsystem comprises a receiving module, for receiving the management request frame.

4. The communication system as claimed in claim 3, wherein the executing subsystem further comprises a determination module, for determining whether the management request frame is correct.

5. The communication system as claimed in claim 4, wherein the determination module comprises a format determination submodule, for determining whether a format of the management request frame is valid.

6. The communication system as claimed in claim 5, wherein the management request frame further comprises a destination service access point (DSAP) field, a source service access point (SSAP) field, and a control field, and the format determination submodule determines whether the format of the management request frame is valid according to the DSAP field, the SSAP field, the control field, and the organization code field.

7. The communication system as claimed in claim 5, wherein the determination module further comprises a content determination submodule, for determining whether content of the management request frame is correct.

8. The communication system as claimed in claim 7, wherein the management request frame further comprises a data field comprising the command, and the content determination submodule determines whether the content of the management request frame is correct according to the data field.

9. The communication system as claimed in claim 7, wherein the executing subsystem further comprises an executing module for executing the command in the management request frame, and a reporting module for reporting the result to the listening module of the management subsystem.

10. A method for managing customer premises equipment (CPE), comprising:
generating a management request frame according to a name of a CPE and a command for the CPE to execute by a management device, wherein the management request frame comprises an organization code field, wherein content of the organization code field is predefined by the management device and the CPE, for authentication between the management device and the CPE during communication between the management device and the CPE;
broadcasting the management request frame to the CPE;
determining whether the management request frame is correct by the CPE after the CPE receives the management request frame;
executing the command if the management request frame is correct; and
reporting a result from the CPE to the management device.

11. The method as claimed in claim 10, further comprising:
discarding the management request frame if the management request frame is not correct.

12. The method as claimed in claim 10, wherein the determining step comprises:
   determining whether a format of the management request frame is valid; and
   determining whether content of the management request frame is correct if the format of the management request frame is valid.

13. The method as claimed in claim 12, wherein the management request frame further comprises a destination service access point (DSAP) field, a source service access point (SSAP) field and a control field, and the method further comprises the step of determining whether the format of the management request frame is valid according to the DSAP field, the SSAP field, the control field, and the organization code field.

14. The method as claimed in claim 12, wherein the management request frame further comprises a data field comprising the command for the CPE to execute, and the method further comprises the step of determining whether the content of the management request frame is correct according to the data field.

15. The method as claimed in claim 10, further comprising: displaying the result.

16. A method for managing customer premises equipment (CPE) in a network, comprising:
   generating, by a management device of a network, a management request frame including a name of a CPE to be managed which is data communicable with said management device through said network, and a command for said CPE to execute, wherein said management request frame comprises an organization code field, wherein content of said organization code field is predefined by said management device and said CPE, for authentication between said management device and said CPE during communication between said management device and said CPE;
   broadcasting said management request frame in said network;
   receiving, by said CPE, said broadcasted management request frame; and
   executing, by said CPE, said command according to said name of said CPE and said management request frame.

17. The method as claimed in claim 16, further comprising the step of reporting executive results from said CPE to said management device through said network.

18. The communication system as claimed in claim 1, wherein the organization code field is set according to the name of the executing subsystem by the management subsystem.

19. The method as claimed in claim 10, wherein the organization code field is set according to the name of the CPE by the management device.

20. The method as claimed in claim 16, wherein said organization code field is set according to said name of said CPE by said management device.

* * * * *

UNITED STATES PATENT AND TRADEMARK OFFICE
CERTIFICATE OF CORRECTION

PATENT NO. : 7,639,691 B2 Page 1 of 1
APPLICATION NO. : 11/556188
DATED : December 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this

Ninth Day of November, 2010

David J. Kappos
*Director of the United States Patent and Trademark Office*